(12) United States Patent
Thybo et al.

(10) Patent No.: US 9,170,039 B2
(45) Date of Patent: Oct. 27, 2015

(54) EXPANSION VALVE WITH VARIABLE OPENING DEGREE

(75) Inventors: Claus Thybo, Soenderborg (DK); Jurgen Suss, Soenderborg (DK)

(73) Assignee: Danfoss A/S, Nordborg (DK)

(*) Notice: Subject to any disclaimer, the term of this patent is extended or adjusted under 35 U.S.C. 154(b) by 0 days.

(21) Appl. No.: 13/990,449

(22) PCT Filed: Nov. 30, 2011

(86) PCT No.: PCT/DK2011/000143
§ 371 (c)(1),
(2), (4) Date: May 30, 2013

(87) PCT Pub. No.: WO2012/072076
PCT Pub. Date: Jun. 7, 2012

(65) Prior Publication Data
US 2013/0248020 A1    Sep. 26, 2013

(30) Foreign Application Priority Data
Nov. 30, 2010   (DK) .................................. 2010 01086

(51) Int. Cl.
*F16K 31/12* (2006.01)
*F25B 41/06* (2006.01)
*F16K 17/30* (2006.01)

(52) U.S. Cl.
CPC ................ *F25B 41/062* (2013.01); *F16K 17/30* (2013.01); *Y10T 137/7787* (2015.04)

(58) Field of Classification Search
CPC ........ F25B 41/062; Y02B 30/72; G05D 7/01; G05D 7/0133; F16K 17/30; Y10T 137/7787
USPC ............ 137/497, 498, 500, 504, 505, 505.25
See application file for complete search history.

(56) References Cited

U.S. PATENT DOCUMENTS 3,699,778 A * 10/1972 Orth ................................ 62/225
4,549,566 A * 10/1985 Fujiwara et al. ......... 137/115.09
(Continued)

FOREIGN PATENT DOCUMENTS

| EP | 1 816 417 A2 | 8/2007 |
|----|----|----|
| WO | 2006079408 A1 | 8/2006 |

OTHER PUBLICATIONS

Search Report for PCT Serial No. PCT/DK2011/000143 dated Aug. 8, 2012.

*Primary Examiner* — Jessica Cahill
(74) *Attorney, Agent, or Firm* — McCormick, Paulding & Huber LLP

(57) ABSTRACT

An expansion valve for a vapor compression system comprises a first valve member and a second valve member. The first valve member and the second valve member are arranged movably relative to each other, and the relative position of the first valve member and the second valve member determines an opening degree of the expansion valve. The first valve member and/or the second valve member is/are automatically movable in response to changes in a differential pressure across the expansion valve, the opening degree of the expansion valve thereby being automatically altered in response to changes in the differential pressure across the expansion valve. It is ensured that the opening degree of the expansion valve is automatically adjusted to the actual operating conditions, thereby optimising the efficiency of the vapour compression system.

12 Claims, 9 Drawing Sheets

(56) References Cited

U.S. PATENT DOCUMENTS

| | | | |
|---|---|---|---|
| 5,022,438 A * | 6/1991 | Faraon-Chaul | 138/42 |
| 5,251,459 A | 10/1993 | Grass et al. | |
| 6,305,414 B1 | 10/2001 | Kozinski | |
| 6,367,283 B1 * | 4/2002 | Enderle | 62/511 |
| 6,418,741 B1 * | 7/2002 | Nungesser et al. | 62/225 |
| 6,711,911 B1 | 3/2004 | Grabon et al. | |
| 6,763,283 B1 | 7/2004 | Murakami | |
| 7,913,504 B2 * | 3/2011 | Lu et al. | 62/222 |
| 2006/0086116 A1 | 4/2006 | Robin | |
| 2007/0180854 A1 * | 8/2007 | Hirota et al. | 62/527 |

* cited by examiner

EXPANSION VALVE WITH VARIABLE OPENING DEGREE

CROSS REFERENCE TO RELATED APPLICATIONS

This application is entitled to the benefit of and incorporates by reference essential subject matter disclosed in International Patent Application No. PCT/DK2011/000143 filed on Nov. 30, 2011 and Danish Patent Application No. PA 2010 01086 filed Nov. 30, 2010.

FIELD OF THE INVENTION

The present invention relates to an expansion valve, in particular an expansion valve for a vapour compression system, such as a refrigeration system, an air condition system or a heat pump. The expansion valve of the invention is capable of defining a variable opening degree. The present invention further relates to a vapour compression system comprising such an expansion valve.

BACKGROUND OF THE INVENTION

Vapour compression systems, such as refrigeration systems, air condition systems or heat pumps, normally comprise a compressor, a condenser, an expansion device, e.g. in the form of an expansion valve, and an evaporator arranged along a refrigerant path. Refrigerant circulates the refrigerant path and is alternatingly compressed and expanded. Heat exchange takes place in the condenser and the evaporator, and it is thereby possible to provide cooling or heating to a closed volume, e.g. a room or a refrigerated compartment or box.

In the case that the expansion device is in the form of an expansion valve, the expansion valve expands the refrigerant and controls the supply of refrigerant to the evaporator. The amount of refrigerant supplied to the evaporator is determined by the opening degree of the expansion valve.

To this end a fixed orifice expansion valve may be used. A fixed orifice expansion valve supplies refrigerant to the evaporator via an orifice with a fixed size. This is very simple, and the valve is easy and cost effective to manufacture. However, it is not possible to adjust the supply of refrigerant to the evaporator, e.g. in response to a measured value of the superheat of refrigerant leaving the evaporator, because it is not possible to adjust the opening degree.

In vapour compression systems where it is necessary or desirable to be able to control the refrigerant supply to the evaporator, a thermostatic expansion valve may be used. The opening degree of a thermostatic expansion valve is adjustable, and an opening degree which accurately results in a desired superheat value can therefore be selected at any given time. However, thermostatic expansion valves are relatively expensive, and they are therefore normally not applied in low cost vapour compression systems.

SUMMARY

It is an object of embodiments of the invention to provide an expansion valve which allows an opening degree to be adjusted, without increasing the manufacturing costs significantly.

It is a further object of embodiments of the invention to provide an expansion valve which is cost effective to manufacture, without significantly compromising the operability and efficiency of the expansion valve.

According to a first aspect the invention provides an expansion valve for a vapour compression system, the expansion valve comprising a first valve member and a second valve member, the first valve member and the second valve member being arranged movably relative to each other, wherein the relative position of the first valve member and the second valve member determines an opening degree of the expansion valve, and wherein the first valve member and/or the second valve member is/are automatically movable in response to changes in a differential pressure across the expansion valve, the opening degree of the expansion valve thereby being automatically altered in response to changes in the differential pressure across the expansion valve.

In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc. The vapour compression system, thus, comprises a compressor, a condenser, an expansion device, e.g. in the form of an expansion valve, and an evaporator arranged along a refrigerant path.

The expansion valve is arranged in the refrigerant path immediately upstream relatively to the evaporator. Thereby the expansion valve expands the refrigerant and controls the supply of expanded refrigerant to the evaporator.

The expansion valve comprises a first valve member and a second valve member. The first valve member and the second valve member are arranged movably relative to each other. This may be obtained by allowing the first valve member to move while the second valve member is fixed relative to the remaining parts of the expansion valve, by allowing the second valve member to move while the first valve member is fixed relative to the remaining parts of the expansion valve, or by allowing the first valve member as well as the second valve member to move, as long as the movements of the first and second valve members results in a relative movement between the valve members.

The relative position of the first valve member and the second valve member determines an opening degree of the expansion valve, i.e. the opening degree of the expansion valve is altered when the relative position of the first valve member and the second valve member is changed.

The first valve member and/or the second valve member is/are automatically movable in response to changes in a differential pressure across the expansion valve. Thus, when the differential pressure across the expansion valve is changed, the first valve member and/or the second valve member is/are automatically moved, thereby changing the relative position of the valve members. Since the opening degree of the expansion valve is determined by the relative position between the valve members, the opening degree is thereby changed. Accordingly, the opening degree of the expansion valve is automatically altered in response to changes in the differential pressure across the expansion valve.

Thereby the opening degree of the expansion valve is automatically adjusted to correspond to a differential pressure which is presently occurring across the expansion valve. This allows the expansion valve to be operated with one opening degree at low differential pressures and with another opening degree at high differential pressures. This is, e.g., desirable when the expansion valve is arranged in a vapour compression system comprising a compressor being capable of operating a two different capacity levels. The two different compressor capacity levels results in two distinct differential pressure levels across the expansion valve. The opening degree of the expansion valve of the invention is automatically altered when the compressor capacity is changed, thereby allowing the vapour compression system to be operated in an optimal manner at both compressor capacity levels.

The efficiency of vapour compression systems, such as residential air condition systems, is normally evaluated by means of the so-called 'Seasonal Energy Efficiency Ratio' (SEER). SEER rating is a well known standard which permits consumers to compare operating costs of various air condition systems and products. It is calculated as the ratio of the total cooling output over the cooling season and the total electrical energy input over the cooling season. In practice, when an air condition system is rated in accordance with the SEER rating, the efficiency of the system is often evaluated at two selected and weighted operating points, corresponding to expected actual operating conditions, i.e. a low compressor capacity operating point, corresponding to low outdoor temperature, and a high compressor capacity operating point, corresponding to high outdoor temperature. It is therefore an advantage of the expansion valve of the present invention that it allows the vapour compression system to be operated in an optimal manner at such two operating points, because it is thereby possible to obtain a good SEER rating, and an improved efficiency as compared to fixed orifice expansion valves.

Furthermore, since the opening degree of the expansion valve is altered automatically in response to changes in the differential pressure, the adjustment of the opening degree is obtained without the requirement of complicated control of the expansion device, e.g. of the kind which is used for controlling thermostatic expansion valves. Thereby good energy efficiency and a good SEER rating can be obtained at low costs.

The first valve member and/or the second valve member may be movable between a first relative position defining a first opening degree at a first differential pressure, and a second relative position defining a second opening degree at a second differential pressure, said second differential pressure being higher than the first differential pressure. The first and/or second valve member may be movable between the two positions in a manner which changes the opening degree discretely, i.e. in such a manner that the opening degree 'jumps' directly from the first opening degree to the second opening degree, or vice versa, when the differential pressure reaches a threshold value. As an alternative, the opening degree may change smoothly between the first opening degree and the second opening degree as a function of the differential pressure.

The first opening degree may be larger than the second opening degree. According to this embodiment, the opening degree of the expansion valve is relatively large at a low differential pressure, corresponding to low compressor capacity, and smaller at a high differential pressure, corresponding to high compressor capacity. At high differential pressures, the fluid flow through an orifice of a given size is higher than at low differential pressures. It is therefore desirable to have a smaller opening degree at high differential pressures, thereby decreasing the fluid flow at high differential pressures and obtaining an optimal refrigerant supply to the evaporator at all differential pressure levels. Furthermore, in the case that a two step compressor is used, a larger opening degree is required at low capacity, and thereby low differential pressure, than at high capacity, and thereby high differential pressure.

The first valve member may be provided with a fluid passage corresponding to the first opening degree and the second valve member may be provided with a fluid passage corresponding to the second opening degree. According to this embodiment, the fluid flow through the expansion valve is determined by the fluid passage provided in the first valve member when the first valve member and the second valve member are in the first relative position. Correspondingly, the fluid flow through the expansion valve is determined by the fluid passage provided in the second valve member when the first valve member and the second valve member are in the second relative position.

As an alternative, one of the valve members may be provided with a fluid passage, and the other valve member may be arranged in such a manner that it partly blocks the fluid passage, the unblocked part of the fluid passage defining the opening degree of the expansion valve. The blocking valve member may, e.g., comprise a protruding part having a conical shape and being arranged movably in the fluid passage.

The first relative position may define a mutual distance between the first valve member and the second valve member, and the first valve member and the second valve member may be arranged substantially in abutment with each other in the second relative position. According to this embodiment, the abutment position may cause one or more fluid passages through the expansion valve to be partly or fully blocked.

According to an alternative embodiment, the first valve member may be or comprise a hollow conical part, and the second valve member may be arranged in such a manner that relative movements of the first and second valve parts causes the second valve member to squeeze the first valve member, thereby altering the cross sectional size of a fluid passage defined through the hollow conical part.

The expansion valve may further comprise guiding means arranged for controlling the relative movements of the first valve member and the second valve member in response to changes in the differential pressure across the expansion valve. The guiding means may, e.g., be in the form of mating conical parts formed on the valve members, or in the form of grooves formed on one of the valve members and protruding parts formed on the other valve member. According to this embodiment, the relative movements of the first and second valve members is accurately controlled, due to the guiding means, thereby providing very accurate control of the opening degree of the expansion valve in response to changes in the differential pressure across the expansion valve.

The expansion valve may further comprise mechanical biasing means arranged to mechanically bias the first valve member and the second valve member in a direction away from each other. The mechanical biasing means may, e.g., comprise a compressible spring arranged between the valve members. Alternatively, the mechanical biasing means may comprise a member made from a resilient material or any other suitable kind of mechanical biasing means. According to this embodiment, the valve members are moved against the biasing force of the mechanical biasing means when they are moved towards each other. The mechanical biasing means may be selected and/or adjusted in such a manner that desired relative movements of the valve members are obtained in response to changes in the differential pressure across the expansion valve during normal operation of the expansion valve, thereby obtaining that the opening degree of the expansion valve is altered in a desired manner.

The expansion valve may further comprise a reverse flow mechanism for selectively allowing a substantially unrestricted reverse fluid flow through the valve. According to this embodiment, the expansion valve may be applied in a vapour compression system in which the fluid flow is reversible. This is, e.g., desirable in vapour compression systems which are capable of operating in an air condition mode as well as in a heat pump mode. Thereby heating or refrigeration may selectively be provided for a room, depending on the outdoor temperature. In order to allow this, the fluid flow must be reversible, and the condenser must be capable of operating as an evaporator and the evaporator as a condenser. Therefore the expansion valve must also be capable of allowing a substantially unrestricted reverse fluid flow to pass through the expansion valve. This is provided by the reverse flow mechanism.

The reverse flow mechanism may, e.g., comprise a bypass fluid passage which is opened when the fluid flow is reversed. Alternatively or additionally, a reverse fluid flow may push the first valve member and the second valve member into a relative position, e.g. far from each other, which allows a substantially unrestricted reverse fluid flow to pass through the expansion valve.

According to a second aspect the invention provides a vapour compression system comprising a compressor, a condenser, an evaporator and an expansion valve according to the first aspect of the invention, the compressor, the condenser, the expansion valve and the evaporator being arranged along a refrigerant path.

It should be noted that a person skilled in the art would readily recognise that any feature described in combination with the first aspect of the invention could also be combined with the second aspect of the invention, and vice versa.

The compressor may be a two-step compressor. As described above, the two steps of the compressor defines two distinct differential pressures across the expansion valve. Since the expansion valve is an expansion valve according to the first aspect of the invention, the opening degree of the expansion valve is influenced when the compressor capacity is switched between the two steps, and the differential pressure across the expansion valve is thereby changed, as described above. The expansion valve of the first aspect of the invention is therefore very suitable for use in a vapour compression system comprising a two-step compressor.

The vapour compression system may be a refrigeration system, such as an air condition system or a refrigeration system of the kind being used in a supermarket. Alternatively, the vapour compression system may be a heat pump, or it may be a vapour compression system which is capable of operating in an air condition mode as well as in a heat pump mode.

BRIEF DESCRIPTION OF THE DRAWINGS

In the following the invention will be described in further detail with reference to the accompanying drawings in which.

DETAILED DESCRIPTION

Figure 1:
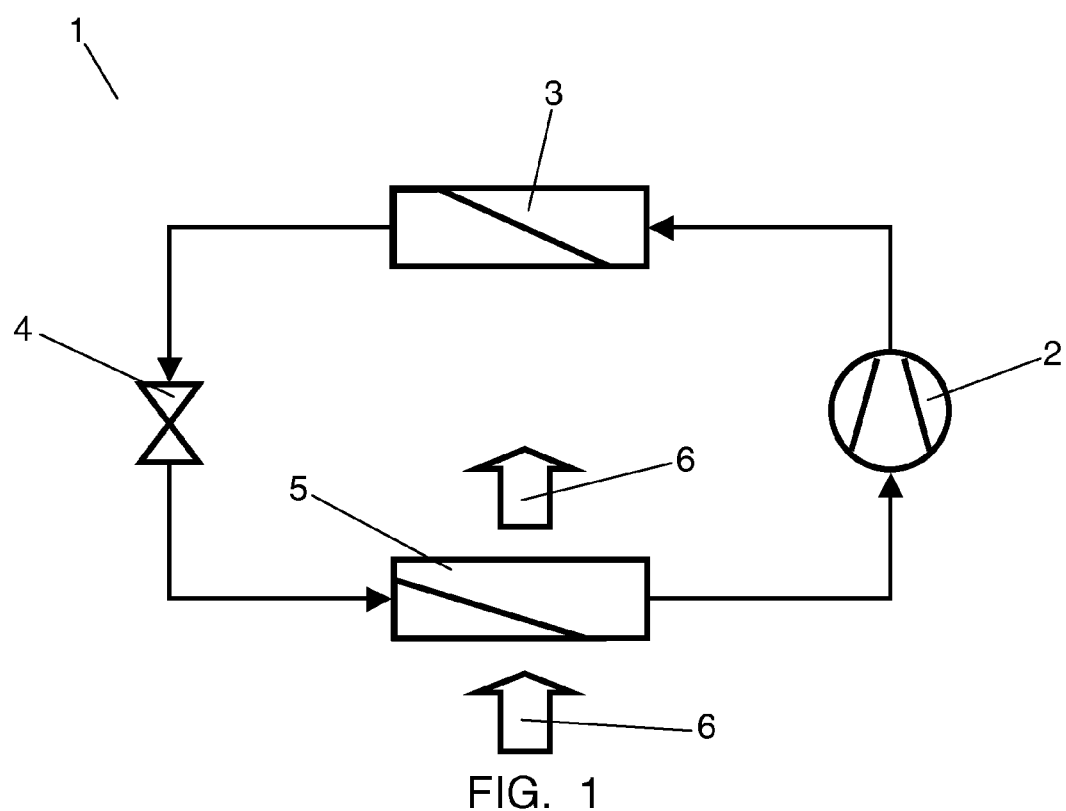
FIG. 1 is a diagrammatic view of a vapour compression system according to an embodiment of the invention.

FIG. 1 is a diagrammatic view of a vapour compression system 1 according to an embodiment of the invention. The vapour compression system 1 comprises a compressor 2, a condenser 3, an expansion valve 4 and an evaporator 5 arranged along a refrigerant path. During operation, refrigerant flowing in the refrigerant path is compressed in the compressor 2. The compressed refrigerant is supplied to the condenser 3, where it condenses, the refrigerant leaving the condenser 3 thereby being in a substantially liquid state. The refrigerant is then supplied to the expansion valve 4 where it is expanded, thereby forming a mixed state refrigerant, i.e. a mixture of gaseous and liquid refrigerant is supplied from the expansion valve 4 to the evaporator 5. In the evaporator 5, the liquid part of the refrigerant is evaporated while exchanging heat with a secondary fluid flow, such as an air flow, across the evaporator 5, illustrated by arrows 6. Finally, the refrigerant is once again supplied to the compressor 2, thereby completing the cycle.

Figure 2A:
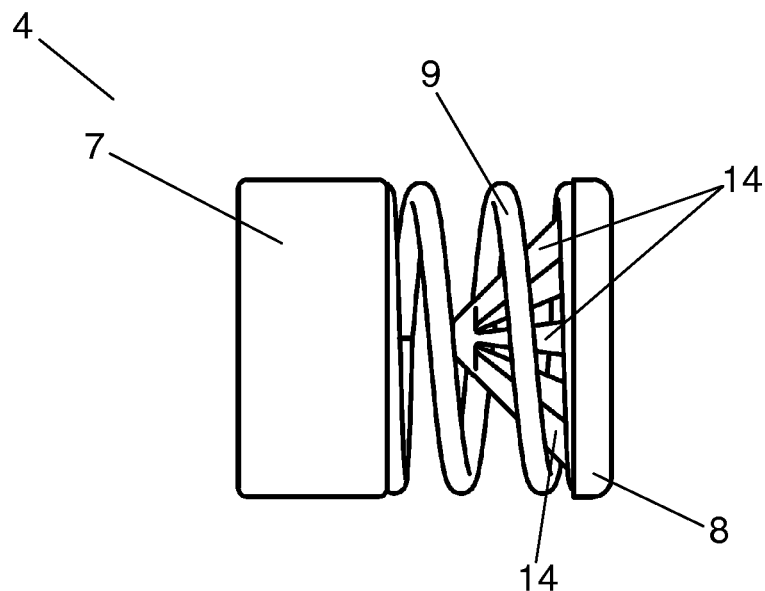
FIG. 2a is a side view and FIG. 2b is a cross sectional view of an expansion valve according to a first embodiment of the invention, the expansion valve being in a first position.

FIG. 2a is a side view of an expansion valve 4 according to a first embodiment of the invention. The expansion valve 4 comprises a first valve member 7 and a second valve member 8. The first valve member 7 and the second valve member 8 are arranged in such a manner that they may perform relative movements. This will be described further below with reference to FIGS. 4 and 5. A compressible spring 9 is arranged between the first valve member 7 and the second valve member 8, thereby biasing the first valve member 7 and the second valve member 8 in a direction away from each other.

In FIG. 2a the first valve member 7 and the second valve member 8 are arranged in a first relative position, where a distance is defined between the first valve member 7 and the second valve member 8. It is clear from FIG. 2a that it is possible to compress the compressible spring 9 further, thereby moving the first valve member 7 and the second valve member 8 towards each other, against the spring force of the compressible spring 9.

Figure 2B:
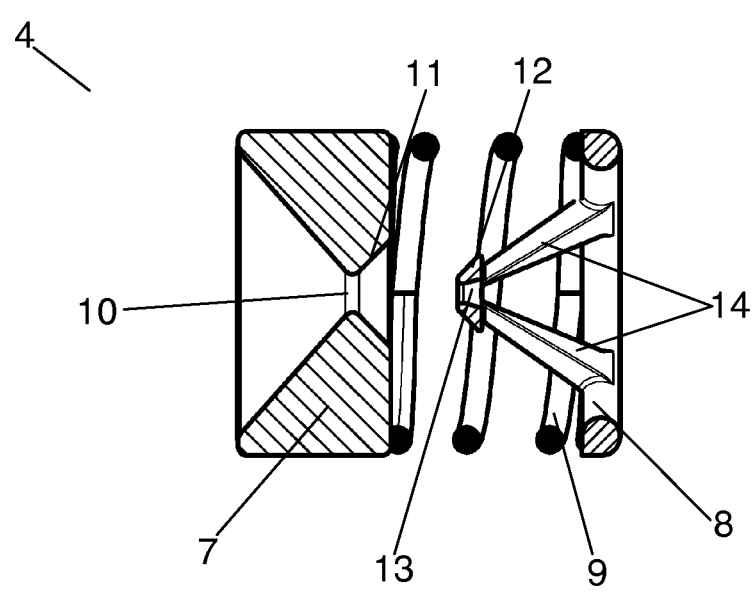

FIG. 2b is a cross sectional view of the expansion valve of FIG. 2a. In FIG. 2b it can be seen that the first valve member 7 is provided with an opening 10 defining a fluid passage through the first valve member 7, the opening 10 having a first diameter. When the first valve member 7 and the second valve member 8 are in the first relative position shown in FIGS. 2a and 2*b*, the fluid flow through the expansion valve 4 is determined by the diameter of the opening 10.

The first valve member 7 is further provided with a conical portion 11 extending towards the second valve member 8. The conical portion 11 of the first valve member 7 is capable of guiding a mating conical portion 12 formed on the second valve member 8. Thereby it is ensured that the conical portions 11, 12 are arranged in abutment when the first valve member 7 and the second valve member 8 are moved towards each other. This will be described in further detail below with reference to FIGS. 3*a* and 3*b*.

The conical portion 11 of the second valve member 8 is also provided with an opening 13. The opening 13 of the second valve member 8 has a smaller diameter than the opening 10 of the first valve member 7. However, when the first valve member 7 and the second valve member 8 are in the first relative position shown in FIGS. 2*a* and 2*b*, the diameter of the opening 13 of the second valve member 8 is not limiting for the fluid flow through the expansion valve 4, because fluid is allowed to flow past the conical portion 11 of the second valve member 8, since the conical portion 11 is attached to the remaining parts of the second valve member 8 by means of a number of ribs 14.

Figure 3A:
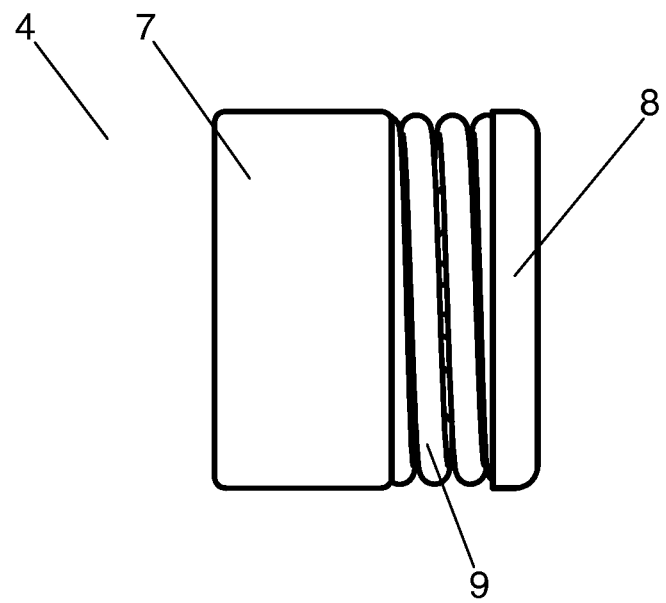
FIG. 3a is a side view and FIG. 3b is a cross sectional view of the expansion valve according to the first embodiment of the invention, the expansion valve being in a second position.

FIG. 3*a* is a side view of the expansion valve 4 according to the first embodiment of the invention, shown in FIGS. 2*a* and 2*b*. In FIG. 3*a* the first valve member 7 and the second valve member 8 are arranged in a second relative position, where the valve members 7, 8 are as close to each other as possible, actually in abutment with each other. It is clear from FIG. 3*a* that the compressible spring 9 is completely compressed in this position.

Figure 3B:
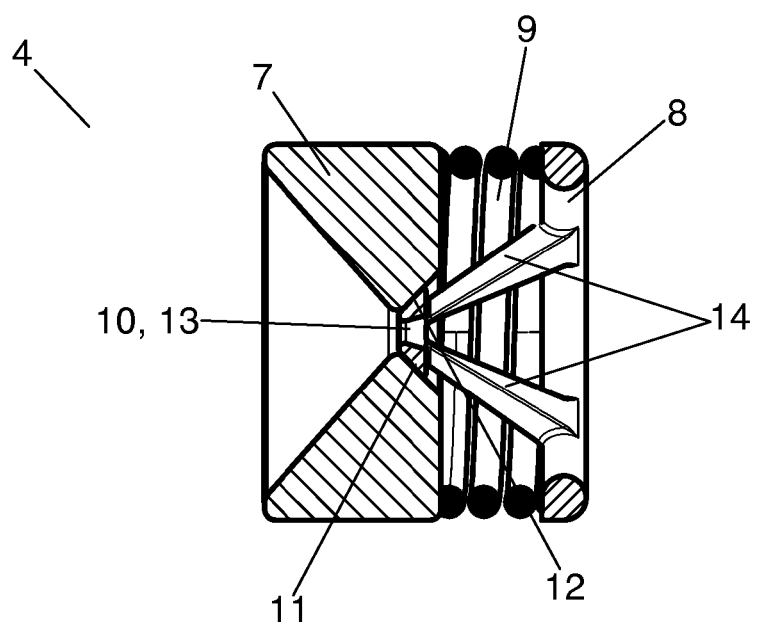

FIG. 3*b* is a cross sectional view of the expansion valve 4 according to the first embodiment of the invention, the expansion valve 4 being in the second position shown in FIG. 3*a*. From FIG. 3*b* it is clear that the first valve member 7 and the second valve member 8 are arranged completely in abutment in this relative position. In particular, it is clear that the conical portion 12 of the second valve member 8 is arranged inside the conical portion 11 of the first valve member 7 in such a manner that the opening 10 defined by the first valve member 7 and the opening 13 defined by the second valve member 8 are arranged adjacent to each other. Thereby a fluid flow passing through the expansion valve 4 when the valve members 7, 8 are in this relative position, must pass through the opening 13 defined by the second valve member 8. Since the diameter of the opening 13 defined by the second valve member 8 is smaller than the diameter of the opening 10 defined by the first valve member 7, the opening degree of the expansion valve 4 is reduced as compared to the situation illustrated in FIGS. 2*a* and 2*b*.

Figure 4:
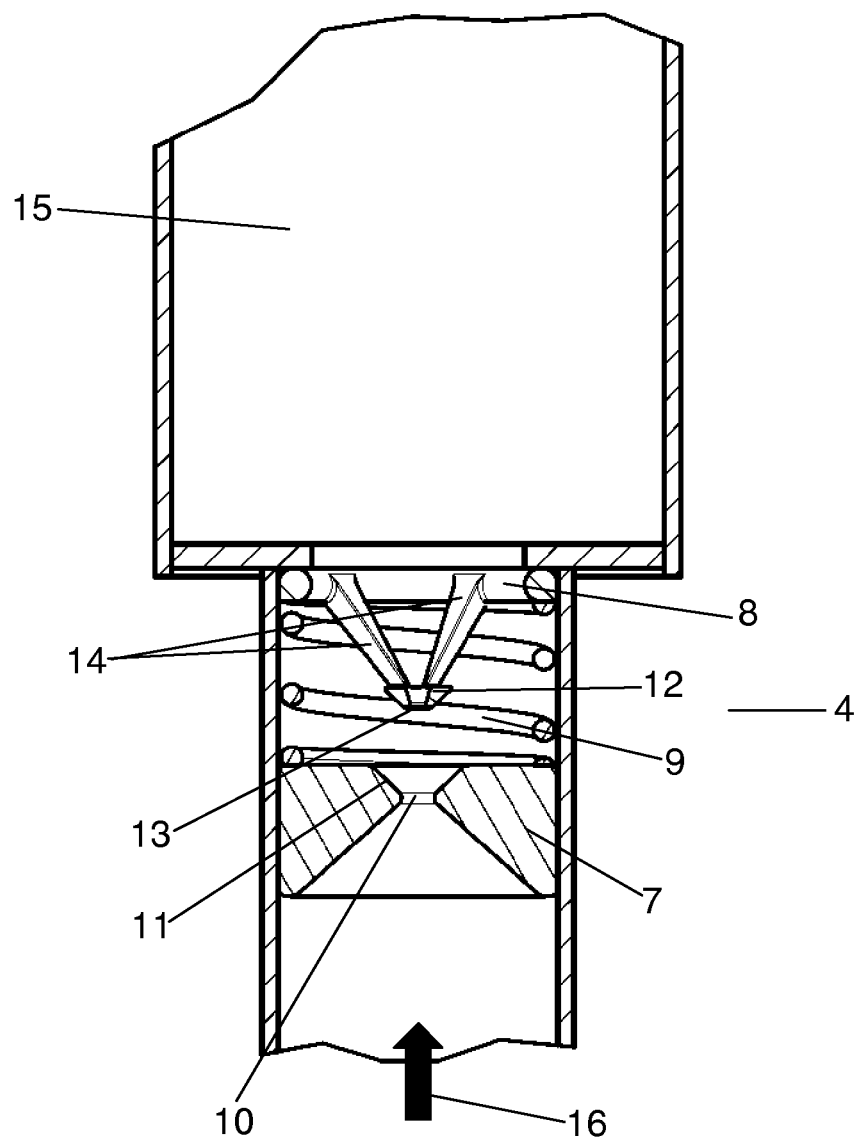
FIG. 4 is a cross sectional view of the expansion valve according to the first embodiment of the invention, arranged in a refrigerant path of a vapour compression system, the expansion valve being in the first position.

FIG. 4 is a cross sectional view of an expansion valve 4 according to the first embodiment of the invention, the expansion valve 4 being arranged in a refrigerant path 15 of a vapour compression system. The expansion valve 4 is arranged immediately upstream relative to an evaporator (not shown), i.e. it is arranged in the liquid line of the evaporator. In FIG. 4 the first valve member 7 and the second valve member 8 of the expansion valve 4 are in the first relative position which is also illustrated in FIGS. 2*a* and 2*b*.

The second valve member 8 is arranged substantially immovably relatively to the refrigerant path 15, and the first valve member 7 is arranged movably relatively to the second valve member 8. The position of the first valve member 7 is determined by the differential pressure across the expansion valve 4 of the refrigerant flowing in the refrigerant path 15. Refrigerant flowing in the refrigerant path 15 and through the expansion valve 4 flows in a direction from the first valve member 7 towards the second valve member 8, i.e. along the direction indicated by arrow 16. Thus, when the differential pressure across the expansion valve 4 is increased, the first valve member 7 will be forced towards the second valve member 8, against the spring force of the compressible spring 9. As long as the valve members 7, 8 are arranged with a mutual distance, the opening degree of the expansion valve 4 will be determined by the diameter of the opening 10 defined by the first valve member 7, as described above with reference to FIG. 2*b*. Thus, the opening degree of the expansion valve 4 is, in this case, as large as possible. In the situation illustrated in FIG. 4 the first valve member 7 is arranged far from the second valve member 8, i.e. the differential pressure across the expansion valve 4 is, in this case, relatively low. Thus, FIG. 4 illustrates that a low differential pressure across the expansion valve 4 results in a large opening degree of the expansion valve 4.

Figure 5:
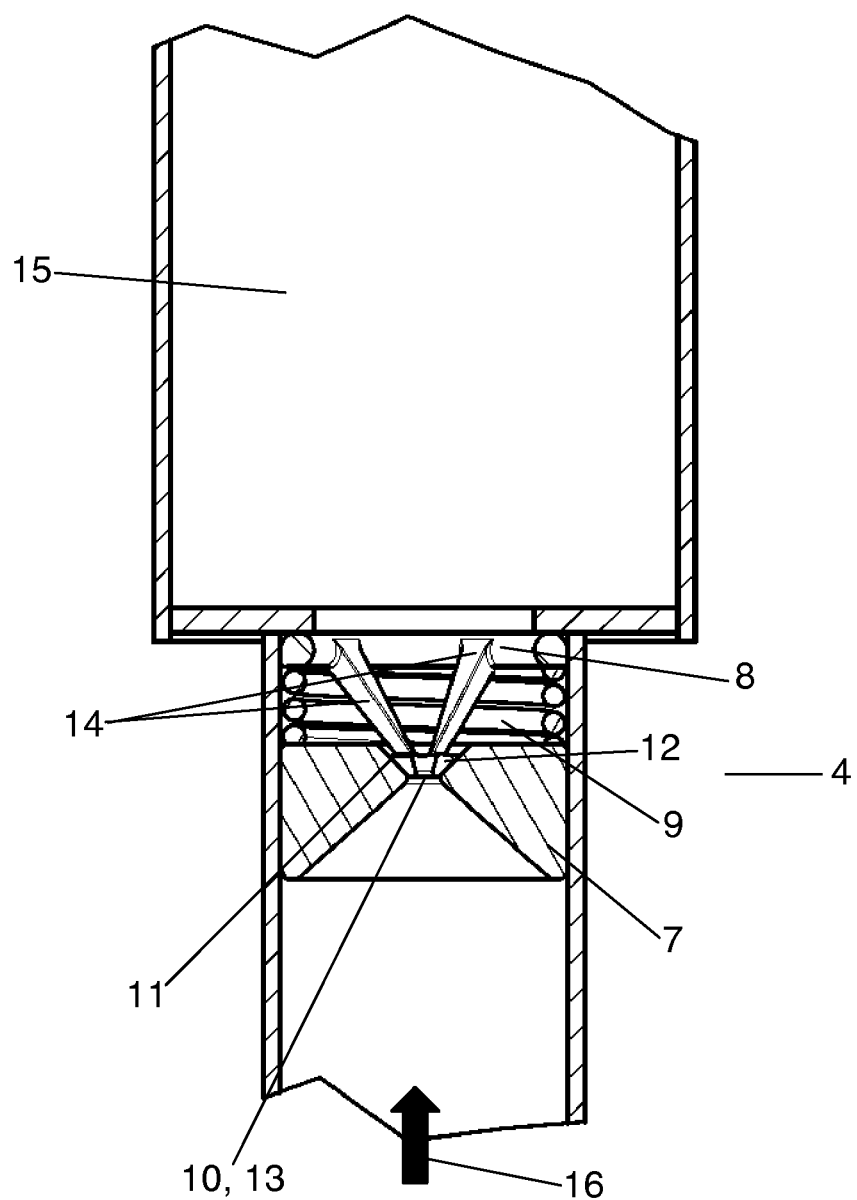
FIG. 5 is a cross sectional view of the expansion valve according to the first embodiment of the invention, arranged in a refrigerant path of a vapour compression system, the expansion valve being in the second position.

FIG. 5 is a cross sectional view of the expansion valve 4 according to the first embodiment of the invention, arranged in a refrigerant path 15, similarly to the situation shown in FIG. 4. The expansion valve 4 is arranged immediately upstream relative to an evaporator (not shown), i.e. it is arranged in the liquid line of the evaporator. However, in FIG. 5 the first valve member 7 and the second valve member 8 are arranged in the second relative position illustrated in FIGS. 3*a* and 3*b*, i.e. the first valve member 7 and the second valve member 8 are arranged substantially in abutment with each other. As described below with reference to FIG. 3*b*, the opening degree of the expansion valve is, in this situation, determined by the diameter of the opening 13 of the second valve member 8. Since the diameter of the opening 13 of the second valve member 8 is smaller than the diameter of the opening 10 of the first valve member 7, the opening degree of the expansion valve 4 in the situation illustrated in FIG. 5 is smaller than the opening degree of the expansion valve 4 in the situation illustrated in FIG. 4.

The position of the first valve member 7 as close as possible to the second valve member 8 indicates that the differential pressure across the expansion valve 4 is relatively high. Thus, FIG. 5 illustrates that a high differential pressure across the expansion valve 4 automatically results in a small opening degree of the expansion valve 4.

Figure 6:
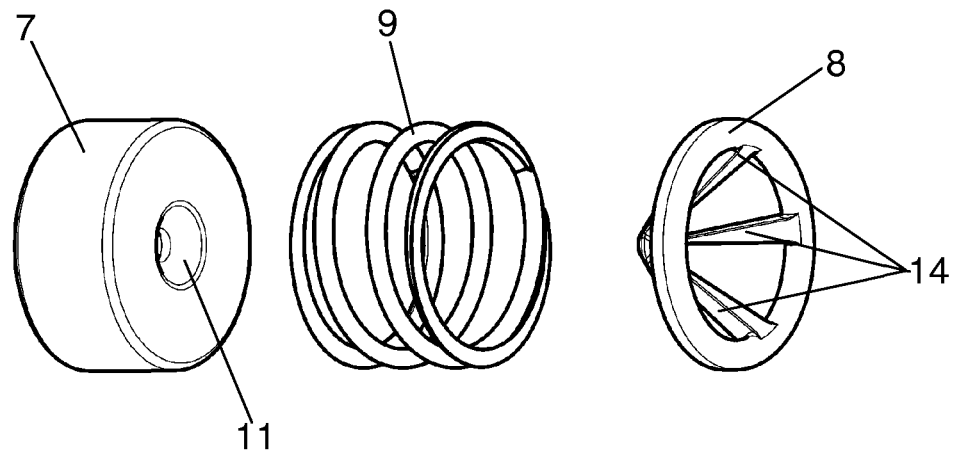
FIG. 6 is an exploded view of the expansion valve according to the first embodiment of the invention, seen from a first direction.
Figure 7:
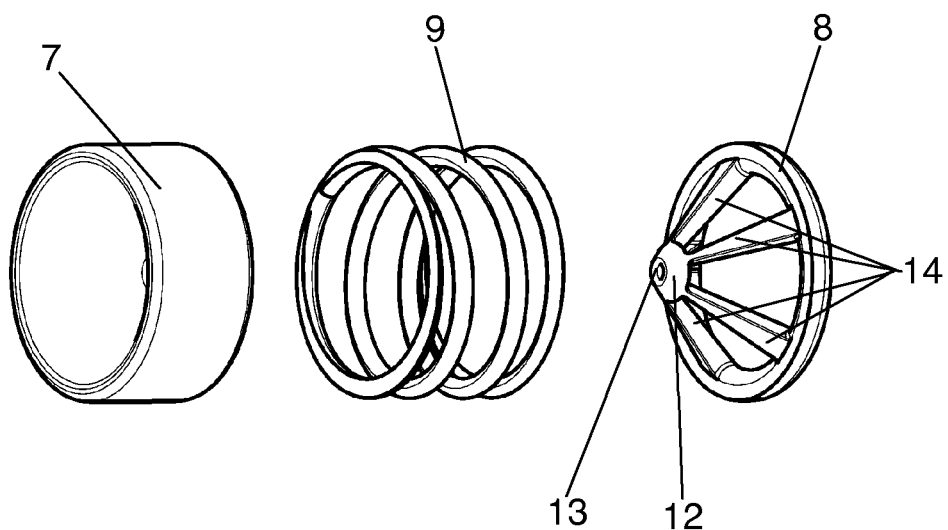
FIG. 7 is an exploded view of the expansion valve according to the first embodiment of the invention, seen from a second direction.

FIGS. 6 and 7 are exploded views of the expansion valve 4 according to the first embodiment of the invention, seen from two different angles. The first valve member 7, the second valve member 8 and the compressible spring 9 are clearly seen. Furthermore, details of the first valve member 7 and the second valve member 8 can be seen, such as the conical sections 11, 12 and the openings 10, 13.

Figure 8:
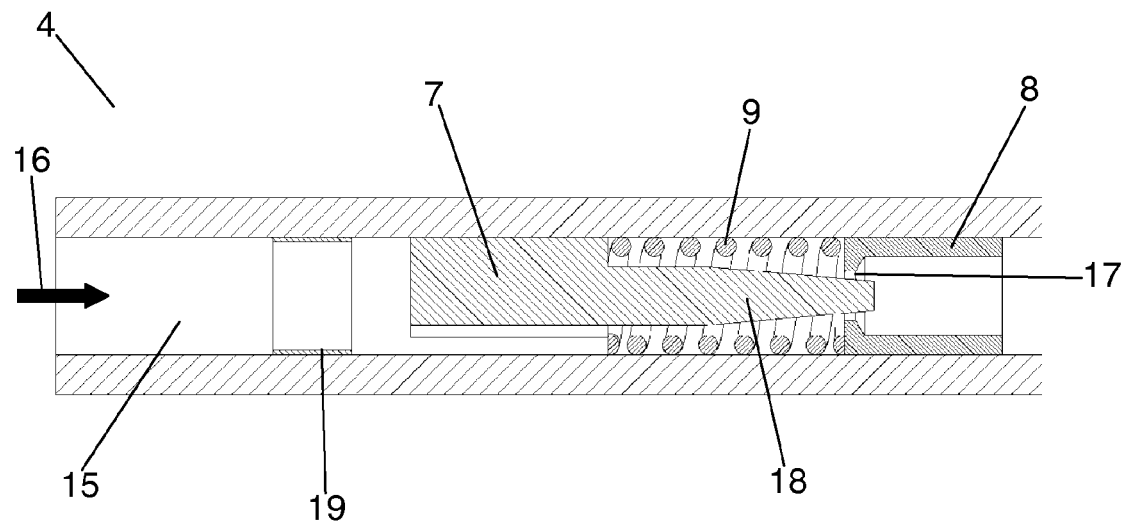
FIG. 8 is a cross sectional view of an expansion valve according to a second embodiment of the invention, the expansion valve being in a first position.

FIG. 8 is a cross sectional view of an expansion valve 4 according to a second embodiment of the invention. The expansion valve 4 is arranged in a refrigerant path 15 of a vapour compression system. The expansion valve 4 comprises a first valve member 7 and a second valve member 8. The second valve member 8 is arranged substantially immovable relatively to the refrigerant path 15, and the first valve member 7 is arranged movably relative to the second valve member 8. A compressible spring 9 is arranged between the first valve member 7 and the second valve member 8, biasing the valve members 7, 8 in a direction away from each other.

The second valve member 8 is provided with an opening 17 defining a fluid passage through the expansion valve 4. The first valve member 7 comprises a protruding element 18 extending in a direction towards the second valve member 8. The protruding element 18 has a conical shape, i.e. the diameter of the protruding element 18 varies along a longitudinal direction of the protruding element 18.

During normal operation of the vapour compression system, refrigerant flows in the refrigerant path 15 and through the expansion valve 4 along a direction from the first valve member 7 towards the second valve member 8, i.e. along the direction indicated by arrow 16. Thus, if the differential pressure across the expansion valve 4 increases, the first valve member 7 will be forced in a direction towards the second valve member 8, against the spring force of the compressible spring 9. Similarly, if the differential pressure across the expansion valve 4 decreases, the first valve member 7 will move in the opposite direction, away from the second valve member 8.

In FIG. 8 the protruding element 18 of the first valve member 7 is arranged in the opening 17 of the second valve member 8, thereby blocking a part of the fluid passage defined by the opening 17. Due to the conical shape of the protruding element 18, the relative position between the first valve member 7 and the second valve member 8 determines how large a part of the fluid passage is blocked by the protruding element 18. Thereby the relative position also determines the size of the remaining passage. Accordingly, the relative position determines the fluid flow through the expansion valve 4, and thereby the opening degree of the expansion valve 4. In FIG. 8 the first valve member 7 is arranged in a position which defines a relatively large opening degree of the expansion valve 4, indicating that the differential pressure across the expansion valve 4 is relatively low.

A stopping member 19 is arranged in the refrigerant path 15 upstream relatively to the expansion valve 4. The function of the stopping member 19 will be described in further detail below with reference to FIG. 10.

Figure 9:
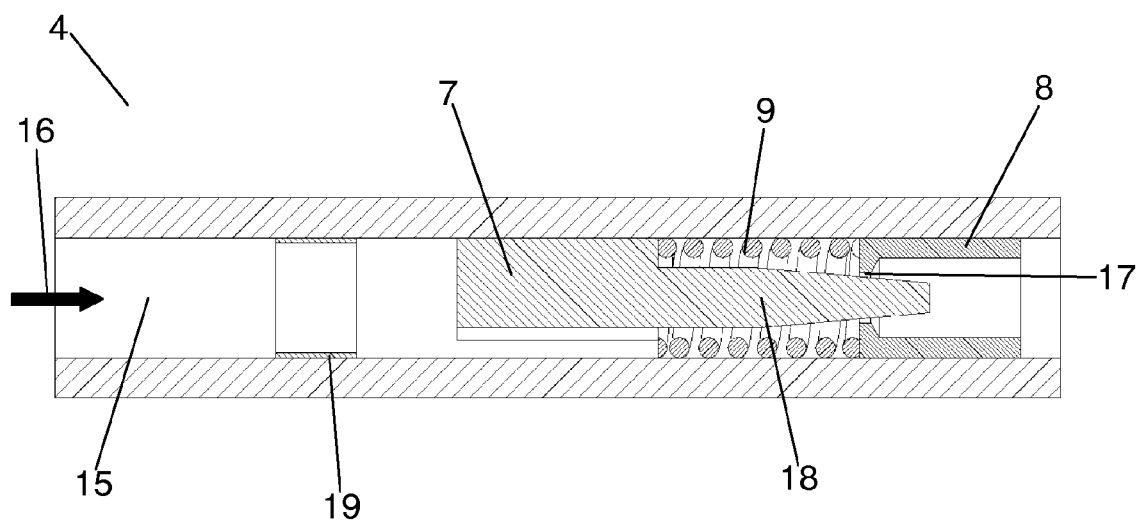
FIG. 9 is a cross sectional view of the expansion valve according to the second embodiment of the invention, the expansion valve being in a second position.

FIG. 9 is a cross sectional view of the expansion valve 4 according to the second embodiment of the invention. In FIG. 9 the differential pressure across the expansion valve 4 is higher than in the situation illustrated in FIG. 8. Accordingly, the first valve member 7 has been moved towards the second valve member 8, against the spring force of the compressible spring 9. Thereby the protruding element 18 has been moved further into the opening 17, and a larger part of the fluid passage defined by the opening 17 is blocked by the protruding element 18. Accordingly, the opening degree of the expansion valve 4 is smaller in the situation illustrated in FIG. 9 than in the situation illustrated in FIG. 8.

Thus, FIGS. 8 and 9 illustrate that the opening degree of the expansion valve 4 automatically decreases when the differential pressure across the expansion valve 4 increases. Similarly, the opening degree of the expansion valve 4 automatically increases when the differential pressure across the expansion valve 4 is decreased.

Figure 10:
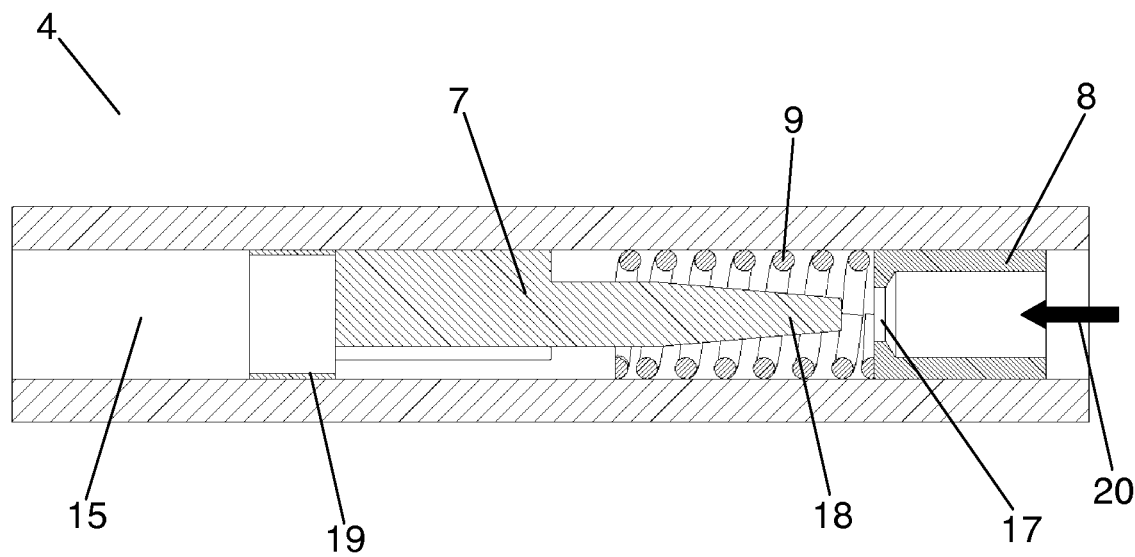
FIG. 10 is a cross sectional view of the expansion valve according to the second embodiment of the invention, during a reverse fluid flow through the expansion valve.

FIG. 10 is a cross sectional view of the expansion valve 4 according to the second embodiment of the invention. In FIG. 10 the fluid flow through the expansion valve 4 has been reversed. Thus, refrigerant flowing through the expansion valve 4 flows along a direction from the second valve member 8 towards the first valve member 7, i.e. along the direction illustrated by arrow 20. This has caused the first valve member 7 to be pushed away from the second valve member 8 and into abutment with the stopping member 19. The stopping member 19 prevents the first valve member 7 from being moved further along this direction. When the first valve member 7 is in this position, the protruding element 18 is no longer arranged inside the opening 17. Thereby the opening 17 is not blocked by the protruding element 18, and the opening degree of the expansion valve 4 is defined by the diameter of the opening 17. This is significantly larger than the opening degrees illustrated in FIGS. 8 and 9, and the fluid flow through the expansion valve 4 is in essence unrestricted.

The reverse flow situation illustrated in FIG. 10 can occur in vapour compression systems which can be selectively operated in an air condition mode or a heat pump mode. In this case the vapour compression system comprises a compressor, two expansion valves and two heat exchangers. The heat exchangers are both capable of operating as an evaporator or as a condenser, depending on the flow direction in the system. Each of the expansion valves is capable of controlling the flow of refrigerant to one of the heat exchangers, when the respective heat exchanger operates as an evaporator. However, when a given heat exchanger operates as a condenser, fluid flow through the corresponding expansion valve should not be restricted. This is obtained by the expansion valve 4 according to the second embodiment of the invention, and the expansion valve 4 illustrated in FIGS. 8-10 is therefore suitable for use in a vapour compression system which is capable of selectively operating in an air condition mode or a heat pump mode.

Figure 11:
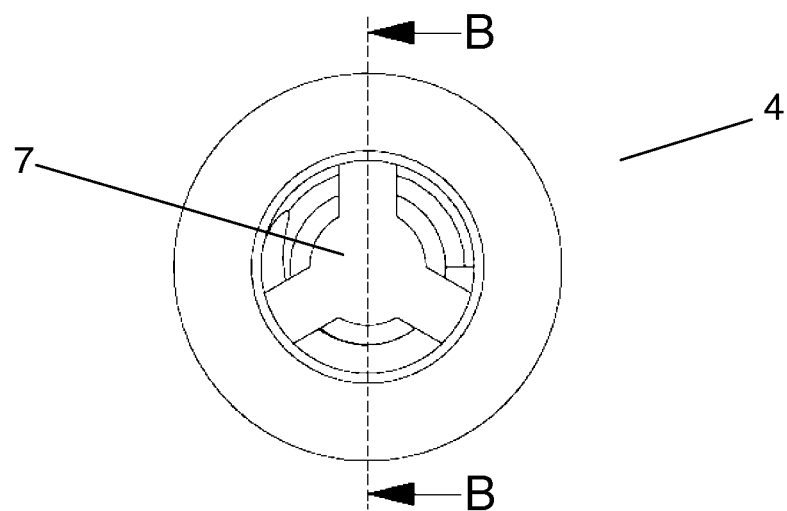
FIG. 11 is an end view of the expansion valve according to the second embodiment of the invention.

FIG. 11 is an end view of the expansion valve 4 according to the second embodiment of the invention. The shape of the first valve member 7 can be seen, and it is clear that refrigerant is allowed to flow past the first valve member 7.

Figure 12:
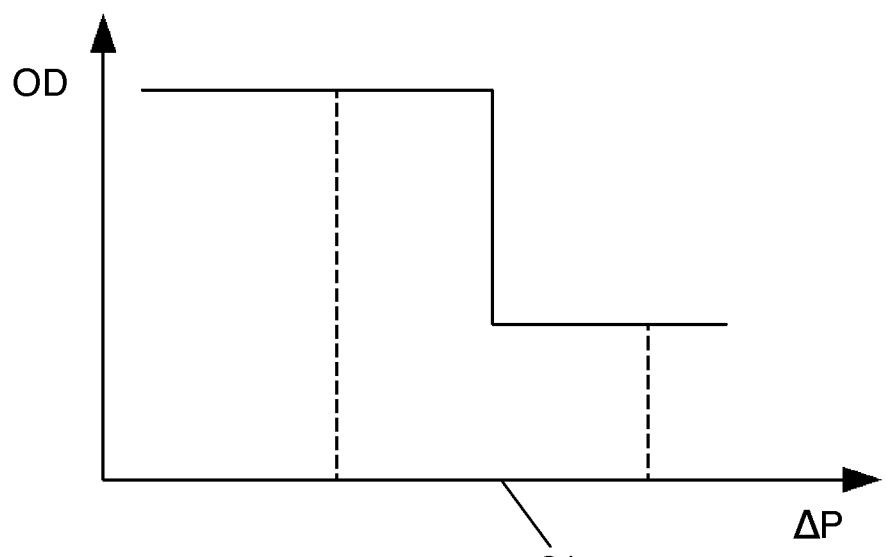
FIGS. 12 and 13 are graphs illustrating opening degree of an expansion valve according to two embodiments of the invention as a function of differential pressure across the expansion valve.

FIG. 12 is a graph illustrating opening degree, OD, of an expansion valve according to the first embodiment of the invention as a function of differential pressure, $\Delta P$, across the expansion valve. In the situation illustrated in FIG. 12, two distinct levels of the opening degree are defined, a high level at low differential pressures, and a low level at high differential pressures. At a threshold value 21 of the differential pressure, the opening degree changes abruptly between the two distinct levels. This corresponds to the behaviour of the expansion valve according to the first embodiment of the invention, and described above with reference to FIGS. 2a-7.

Figure 13:
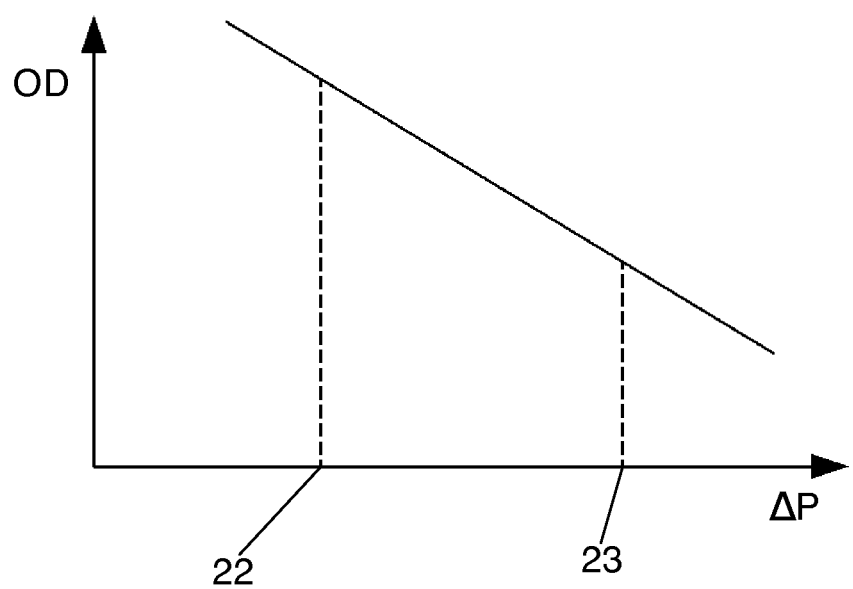

FIG. 13 is a graph illustrating opening degree, OD, of an expansion valve according to the second embodiment of the invention as a function of differential pressure, $\Delta P$, across the expansion valve. In the situation illustrated in FIG. 13, the opening degree decreases substantially linearly as the differential pressure increases. Two illustrative points 22, 23 on the curve are marked. These could, e.g., illustrate the measurement points used for evaluating the SEER value of the vapour compression system. The graph of FIG. 13 could, e.g., originate from the expansion valve 4 according to the second embodiment of the invention, described above with reference to FIGS. 8-11.

Although various embodiments of the present invention have been described and shown, the invention is not restricted thereto, but may also be embodied in other ways within the scope of the subject-matter defined in the following claims.

What is claimed is:

1. An expansion valve for a vapour compression system, the expansion valve comprising a first valve member and a second valve member, the first valve member and the second valve member being arranged movably relative to each other between a first relative position defining a first opening degree at a first differential pressure and a second relative position defining a second opening degree at a second differential pressure, a biasing mechanism arranged to mechanically bias the first valve member and the second valve member in a direction away from each other, wherein the relative position of the first valve member and the second valve member determines an opening degree of the expansion valve, wherein the first valve member and/or the second valve member is/are automatically movable in response to changes in a differential pressure across the expansion valve, the opening degree of the expansion valve thereby being automatically altered in response to changes in the differential pressure across the expansion valve, wherein the first valve member and the second valve member, when biased in a direction away from each other by the mechanical biasing mechanism, allow a reverse fluid flow to pass through the expansion valve, and wherein the first valve member is provided with a fluid passage corresponding to the first opening degree and the second valve member is provided with a fluid passage corresponding to the second opening degree;

wherein the second differential pressure is higher than the first differential pressure; and wherein the first opening degree is larger than the second opening degree.

2. The expansion valve according to claim 1, further comprising a guiding mechanism arranged for controlling the relative movements of the first valve member and the second valve member in response to changes in the differential pressure across the expansion valve.

3. The expansion valve according claim 1, wherein the first valve member is provided with a fluid passage corresponding to the first opening degree and the second valve member is provided with a fluid passage corresponding to the second opening degree.

4. The expansion valve according to claim 1, wherein the first relative position defines a mutual distance between the first valve member and the second valve member, and wherein the first valve member and the second valve member are arranged substantially in abutment with each other in the second relative position.

5. The expansion valve according to claim 1, further comprising a guiding mechanism arranged for controlling the relative movements of the first valve member and the second valve member in response to changes in the differential pressure across the expansion valve.

6. A vapour compression system comprising a compressor, a condenser, an evaporator and an expansion valve according to claim 1, the compressor, the condenser, the expansion valve and the evaporator being arranged along a refrigerant path.

7. The vapour compression system according to claim 6, wherein the compressor is a two-step compressor.

8. The vapour compression system according to claim 6, wherein the vapour compression system is a refrigeration system.

9. An expansion valve for a vapour compression system, the expansion valve comprising a first valve member and a second valve member, the first valve member and the second valve member being arranged movably relative to each other between a first relative position defining a first opening degree at a first differential pressure and a second relative position defining a second opening degree at a second differential pressure, a biasing mechanism arranged to mechanically bias the first valve member and the second valve member in a direction away from each other, wherein the relative position of the first valve member and the second valve member determines an opening degree of the expansion valve, wherein the first valve member and/or the second valve member is/are automatically movable in response to changes in a differential pressure across the expansion valve, the opening degree of the expansion valve thereby being automatically altered in response to changes in the differential pressure across the expansion valve, wherein the first valve member and the second valve member, when biased in a direction away from each other by the mechanical biasing mechanism, allow a reverse fluid flow to pass through the expansion valve, and wherein the first valve member is provided with a fluid passage corresponding to the first opening degree and the second valve member is provided with a fluid passage corresponding to the second opening degree;

wherein the first relative position defines a mutual distance between the first valve member and the second valve member, and wherein the first valve member and the second valve member are arranged substantially in abutment with each other in the second relative position.

10. An expansion valve for a vapour compression system, the expansion valve comprising a first valve member and a second valve member, the first valve member and the second valve member being arranged movably relative to each other, a biasing mechanism arranged to mechanically bias the first valve member and the second valve member in a direction away from each other, wherein the relative position of the first valve member and the second valve member determines an opening degree of the expansion valve, wherein the first valve member and/or the second valve member is/are automatically movable in response to changes in a differential pressure across the expansion valve, the opening degree of the expansion valve thereby being automatically altered in response to changes in the differential pressure across the expansion valve, wherein one of the first valve member and the second valve member is provided with a conical portion guided by at least two ribs attached to said valve member, wherein the first valve member and the second valve member, when biased in a direction away from each other by the mechanical biasing mechanism, allow a reverse fluid flow to pass through the expansion valve, and wherein the ribs allow for fluid flow past the conical portion.

11. An expansion valve for a vapour compression system, the expansion valve comprising a first valve member and a second valve member, the first valve member and the second valve member being arranged movably relative to each other between a first relative position defining a first opening degree at a first differential pressure and a second relative position defining a second opening degree at a second differential pressure, a biasing mechanism arranged to mechanically bias the first valve member and the second valve member in a direction away from each other, wherein the relative position of the first valve member and the second valve member determines an opening degree of the expansion valve, wherein the first valve member and/or the second valve member is/are automatically movable in response to changes in a differential pressure across the expansion valve, the opening degree of the expansion valve thereby being automatically altered in response to changes in the differential pressure across the expansion valve, wherein the first valve member and the second valve member, when biased in a direction away from each other by the mechanical biasing mechanism, allow a reverse fluid flow to pass through the expansion valve, and wherein the first valve member is provided with a fluid passage corresponding to the first opening degree and the second valve member is provided with a fluid passage corresponding to the second opening degree;

wherein the second differential pressure is higher than the first differential pressure; and wherein the first relative position defines a mutual distance between the first valve member and the second valve member, and wherein the first valve member and the second valve member are arranged substantially in abutment with each other in the second relative position.

12. The expansion valve according to claim 11, further comprising a guiding mechanism arranged for controlling the relative movements of the first valve member and the second valve member in response to changes in the differential pressure across the expansion valve.

* * * * *